(12) United States Patent
Bahel et al.

(10) Patent No.: US 7,010,926 B2
(45) Date of Patent: Mar. 14, 2006

(54) CONDENSING UNIT PERFORMANCE SIMULATOR AND METHOD

(75) Inventors: Vijay Bahel, Sidney, OH (US); Altaf Hossain, Sidney, OH (US)

(73) Assignee: Copeland Corporation, Sidney, OH (US)

( * ) Notice: Subject to any disclaimer, the term of this patent is extended or adjusted under 35 U.S.C. 154(b) by 0 days.

(21) Appl. No.: 10/920,140

(22) Filed: Aug. 17, 2004

(65) Prior Publication Data

US 2005/0011204 A1    Jan. 20, 2005

Related U.S. Application Data

(63) Continuation of application No. 10/436,601, filed on May 13, 2003, now Pat. No. 6,775,995.

(51) Int. Cl.
*F25B 49/00* (2006.01)
*F25D 17/06* (2006.01)
*G06G 7/48* (2006.01)

(52) U.S. Cl. .............................. 62/127; 62/190; 703/7

(58) Field of Classification Search ................ 62/125, 62/127, 185, 190, 229; 703/1, 7
See application file for complete search history.

(56) References Cited

U.S. PATENT DOCUMENTS

| | | | | |
|---|---|---|---|---|
| 5,748,943 A * | 5/1998 | Kaepp et al. | ................... | 703/1 |
| 5,860,285 A * | 1/1999 | Tulpule | ........................ | 62/127 |
| 6,209,794 B1 * | 4/2001 | Webster et al. | ................ | 236/94 |
| 6,272,868 B1 * | 8/2001 | Grabon et al. | ................. | 62/125 |
| 6,477,518 B1 * | 11/2002 | Li et al. | ......................... | 706/45 |
| 6,487,525 B1 * | 11/2002 | Hall et al. | ...................... | 703/7 |
| 6,591,620 B1 * | 7/2003 | Kikuchi et al. | ............... | 62/126 |
| 6,651,037 B1 * | 11/2003 | Hall et al. | ...................... | 703/8 |
| 6,698,663 B1 * | 3/2004 | Wang et al. | ................ | 236/49.3 |
| 2002/0084063 A1 * | 7/2002 | Gawthrop et al. | ........... | 165/110 |
| 2003/0208341 A9 * | 11/2003 | Simmons et al. | ............... | 703/1 |
| 2004/0199371 A1 * | 10/2004 | Sasano et al. | ................. | 703/22 |

FOREIGN PATENT DOCUMENTS

| JP | 09-257319 | * 10/1997 |
|---|---|---|
| JP | H9-257319 | 10/1997 |

* cited by examiner

*Primary Examiner*—Marc Norman
(74) *Attorney, Agent, or Firm*—Harness, Dickey & Pierce

(57) ABSTRACT

A system and method for determining thermal performance of a condensing unit includes selecting the condensing unit from a condensing unit database and a compressor from a compressor database. Condensing unit characteristics and compressor characteristics are processed based on simulation points to provide thermal performance data for the condensing unit.

24 Claims, 24 Drawing Sheets

Copeland Corporation
Condensing Unit Division
50Hz Air-Cooled Unit Performance

| Unit Model: | CJDL-0750-TFD-001 | | | Refrigerant: | | R-404A |
|---|---|---|---|---|---|---|
| Compressor: | 3DB3A075E-TFD | | | Return Gas Temp. (°F): | | 65 |
| Condenser: | 066-0262-00 x 1 | | | Subcooling (°F): | | 5 |
| Fan Motor: | 050-0248-01 x 1 | | | Air Flow Rate (CFM): | | 3890 |
| Fan Blade: | 083-0115-00 x 1 | | | Fan Motor Power (Watt): | | 510 |
| Unit Dimensions: | 44.1"L x 36.0"W x 31.5"H | | | Unit Drawing No: | | 496-0376-00 |

Performance : 90°F Ambient Air Temperature

| Evap. Temp. (°F) | Unit Capacity (Btu/hr) | Power (Watt) | Unit EER (Btu/Wh) | Cond. Temp. (°F) | Temp. Diff. (°F) | Refr. P.d. (Psi) | Air P.d. (Inch Wg) |
|---|---|---|---|---|---|---|---|
| -40 | 18,700 | 4,440 | 4.2 | 100.4 | 10.4 | 1.9 | 0.56 |
| -35 | 21,600 | 4,820 | 4.5 | 101.4 | 11.4 | 1.7 | 0.56 |
| -30 | 24,900 | 5,220 | 4.8 | 102.7 | 12.7 | 1.6 | 0.56 |
| -25 | 28,600 | 5,650 | 5.1 | 104.0 | 14.0 | 1.6 | 0.56 |
| -20 | 32,700 | 6,100 | 5.4 | 105.5 | 15.5 | 1.8 | 0.57 |
| -15 | 37,000 | 6,550 | 5.6 | 107.2 | 17.2 | 1.8 | 0.57 |
| -10 | 41,500 | 7,010 | 5.9 | 108.9 | 18.9 | 2.1 | 0.57 |
| -5 | 46,200 | 7,450 | 6.2 | 110.6 | 20.6 | 2.5 | 0.57 |
| 0 | 50,900 | 7,880 | 6.5 | 112.7 | 22.7 | 3.0 | 0.57 |

Performance : 100°F Ambient Air Temperature

| Evap. Temp. (°F) | Unit Capacity (Btu/hr) | Power (Watt) | Unit EER (Btu/Wh) | Cond. Temp. (°F) | Temp. Diff. (°F) | Refr. P.d. (Psi) | Air P.d. (Inch Wg) |
|---|---|---|---|---|---|---|---|
| -40 | 16,600 | 4,440 | 3.7 | 109.8 | 9.8 | 1.9 | 0.58 |
| -35 | 19,300 | 4,860 | 4.0 | 110.8 | 10.8 | 1.7 | 0.58 |
| -30 | 22,400 | 5,290 | 4.2 | 111.9 | 11.9 | 1.6 | 0.58 |
| -25 | 25,800 | 5,750 | 4.5 | 113.2 | 13.2 | 1.6 | 0.58 |
| -20 | 29,600 | 6,220 | 4.8 | 114.6 | 14.6 | 1.7 | 0.58 |

FIG 9

50Hz Unit Performance at 90 °F Ambient Air Temp.

| Evap. Temp. (°F) | Unit Capacity (Btu/hr) | Unit Power (Watt) | Unit EER (Btu/Wh) | Cond. Temp. (°F) | Temperature Difference (°F) | Ref Side Press. Drop (Psi) | Air Side Press. Drop (Inch Wg) |
|---|---|---|---|---|---|---|---|
| -40 | 18,700 | 4,440 | 4.2 | 100.4 | 10.4 | 1.9 | 0.56 |
| -35 | 21,600 | 4,820 | 4.5 | 101.4 | 11.4 | 1.7 | 0.56 |
| -30 | 24,900 | 5,220 | 4.8 | 102.7 | 12.7 | 1.6 | 0.56 |
| -25 | 28,600 | 5,650 | 5.1 | 104.0 | 14.0 | 1.6 | 0.56 |
| -20 | 32,700 | 6,100 | 5.4 | 105.5 | 15.5 | 1.8 | 0.57 |
| -15 | 37,000 | 6,550 | 5.6 | 107.2 | 17.2 | 2.1 | 0.57 |
| -10 | 41,500 | 7,010 | 5.9 | 108.9 | 18.9 | 2.5 | 0.57 |
| -5 | 46,200 | 7,450 | 6.2 | 110.6 | 20.6 | 3.0 | 0.57 |
| 0 | 50,900 | 7,880 | 6.5 | 112.7 | 22.7 | 3.1 | 0.57 |

White on Blue = Exceeds Design Delta T Limit

3DB3A075E-TFD (R-404A)

50 Hz Rated Power [Watt]

| Evap. Temp. --> | -40°F | -35°F | -30°F | -25°F | -20°F | -15°F | -10°F | -5°F | 0°F |
|---|---|---|---|---|---|---|---|---|---|
| 70°F Cond. | 3,760 | 3,960 | 4,190 | 4,440 | 4,690 | 4,950 | 5,210 | 5,450 | 5,680 |
| 80°F Cond. | 3,830 | 4,100 | 4,380 | 4,690 | 5,000 | 5,310 | 5,620 | 5,920 | 6,190 |
| 90°F Cond. | 3,890 | 4,210 | 4,550 | 4,910 | 5,270 | 5,630 | 5,990 | 6,320 | 6,640 |
| 100°F Cond. | 3,930 | 4,300 | 4,680 | 5,090 | 5,490 | 5,890 | 6,290 | 6,660 | 7,010 |
| 110°F Cond. | 3,930 | 4,340 | 4,770 | 5,210 | 5,650 | 6,090 | 6,520 | 6,930 | 7,310 |
| 120°F Cond. | 3,900 | 4,340 | 4,810 | 5,280 | 5,750 | 6,220 | 6,670 | 7,100 | 7,510 |
| 130°F Cond. | 3,810 | 4,280 | 4,770 | 5,270 | 5,770 | 6,260 | 6,730 | 7,180 | 7,600 |

Displacement — Scaling Factor: 1.200

EER
- Capacity Scaling Factor: 1.000
- Power Scaling Factor: 1.000

Scale Performance Selection
- ● Displacement
- ○ EER
- ○ Both

Extend Operating Envelope
- Min. Evap. Temp. (°F): -40
- Max. Evap. Temp. (°F): 0
- Min. Cond. Temp. (°F): 70
- Max. Cond. Temp. (°F): 130

□ Scale Performance

[Refresh Performance] [Apply Envelope Check] [Close]

Compressor Selection — 3DB3A075E-TFD (R-404A)

Tabs: Selection | Rated Capacity | Rated Power | Re-Rated Capacity | Re-Rated Power | Current

50 Hz Current (Amp)

| Evap. Temp. --> | -40°F | -35°F | -30°F | -25°F | -20°F | -15°F | -10°F | -5°F | 0°F |
|---|---|---|---|---|---|---|---|---|---|
| 70°F Cond. | 8.3 | 8.6 | 8.9 | 9.2 | 9.5 | 9.9 | 10.2 | 10.5 | 10.8 |
| 80°F Cond. | 8.4 | 8.7 | 9.1 | 9.5 | 10.0 | 10.4 | 10.8 | 11.2 | 11.6 |
| 90°F Cond. | 8.5 | 8.9 | 9.3 | 9.8 | 10.3 | 10.8 | 11.3 | 11.8 | 12.3 |
| 100°F Cond. | 8.5 | 9.0 | 9.5 | 10.1 | 10.6 | 11.2 | 11.8 | 12.3 | 12.8 |
| 110°F Cond. | 8.5 | 9.1 | 9.6 | 10.2 | 10.8 | 11.5 | 12.1 | 12.7 | 13.3 |
| 120°F Cond. | 8.5 | 9.1 | 9.7 | 10.3 | 11.0 | 11.6 | 12.3 | 13.0 | 13.6 |
| 130°F Cond. | 8.4 | 9.0 | 9.6 | 10.3 | 11.0 | 11.7 | 12.4 | 13.1 | 13.8 |

Apply Envelope Check | Close

CONDENSING UNIT PERFORMANCE SIMULATOR AND METHOD

CROSS-REFERENCE TO RELATED APPLICATIONS

This is a continuation of U.S. Ser. No. 10/436,601, filed May 13, 2003, now U.S. Pat. No. 6,775,995, which is incorporated herein by reference in its entirety.

FIELD OF THE INVENTION

The present invention relates to condensers, and more particularly to simulating performance of a condensing unit of an air-conditioning or refrigeration system.

BACKGROUND OF THE INVENTION

Traditional cooling systems, such as refrigeration and air-conditioning systems, include a compressor, a condensing unit, an expansion valve and an evaporator. The compressor compresses gaseous refrigerant exiting the evaporator and discharges the high pressure refrigerant to the condensing unit. The condensing unit operates as a heat exchanger enabling heat transfer from the gaseous refrigerant to a heat sink (e.g. air or water). The refrigerant condenses within the condensing unit and a state change occurs from gas to liquid. The liquid refrigerant exits the condensing unit and flows to the evaporator through the expansion valve. The evaporator also operates as a heat exchanger enabling heat transfer from the atmosphere surrounding the evaporator to the liquid refrigerant. As the heat transfer occurs, the temperature of the refrigerant increases until a state change occurs from liquid to gas. The gas refrigerant is drawn into the suction side of the compressor and the cooling cycle continues.

The condensing unit can be one of an air-cooled condensing unit (ACU) or a water-cooled condensing unit (WCU). An ACU typically includes a fin-tube refrigerant-to-air heat exchanger, an air flow device such as a fan motor and fan blade and associated controls (not shown). In the case of an ACU, air provides the heat sink enabling heat transfer from the condensing unit. A WCU typically includes a refrigerant-to-water heat exchanger and associated controls (not shown). In the case of a WCU, water provides the heat sink enabling heat transfer from the condensing unit.

In order to competently design a new cooling system or maintain an existing cooling system, the potential performance of the individual components within the system need be estimated. Traditionally, system condensers are selected based on the refrigerant type and ratings provided by the manufacturer. However, these ratings are determined under fixed conditions and not actual system operational conditions. Therefore, although the rating of a condenser may suggest that it is proper for the particular cooling system, the actual performance of that condenser within the cooling system may be far less than optimal.

SUMMARY OF THE INVENTION

The present invention provides a system and method for determining thermal performance of a condensing unit by selecting the condensing unit from a condensing unit database. Condensing unit characteristics and compressor characteristics are processed based on the simulation points to provide thermal performance data for the condensing unit.

Selecting the condensing unit from a condensing unit database may include selecting a condenser, selecting a fan motor and selecting a fan blade. Selecting the condensing unit may be achieved by inputting part numbers of condensing unit components that are cross-referenced with the database.

Determining the simulation points may include selecting an application type for an evaporator of the cooling system. The application type may include one of a low temperature range, a medium temperature range, an extended medium temperature range and a high temperature range.

The thermal performance data may be output in one of a graphical format, a spreadsheet format and a tabulated format. The thermal performance data may include condensing unit capacity across each of the simulation points for a given ambient temperature at which the condensing unit operates. The system and method may further include scaling the thermal performance data based on compressor frequency.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a screen-shot illustrating a compressor selection screen;

FIG. 6 is a screen-shot illustrating a condenser geometry and temperature characteristic screen;

FIG. 9 is a screen-shot illustrating ACU thermal performance output in spreadsheet format;

FIG. 11 is a screen-shot illustrating ACU thermal performance output in tabulated format including design envelope flags;

Figure 12:
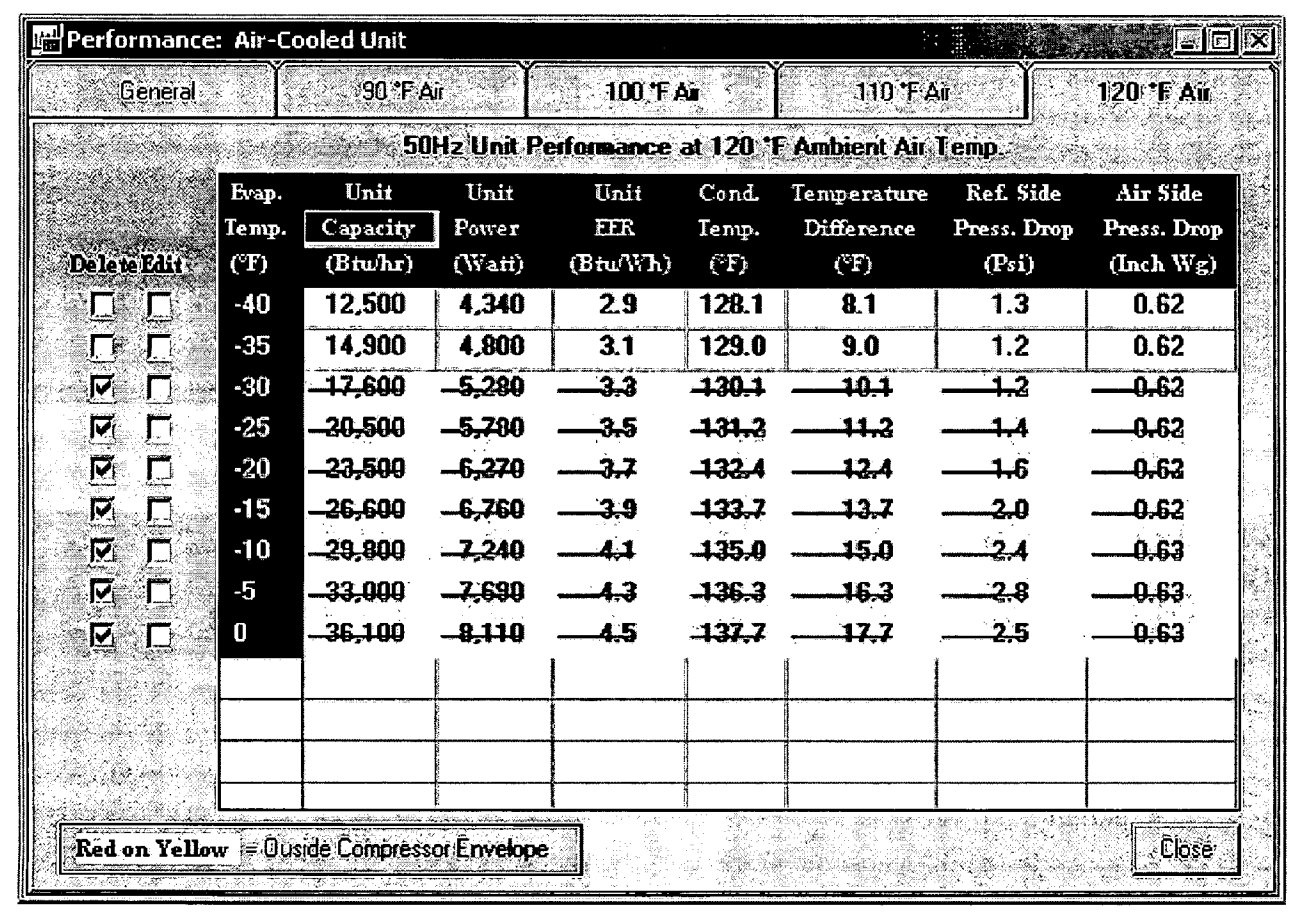

FIG. 12 is a screen-shot illustrating ACU thermal performance output in tabulated format including operating envelope flags;

Figure 16:
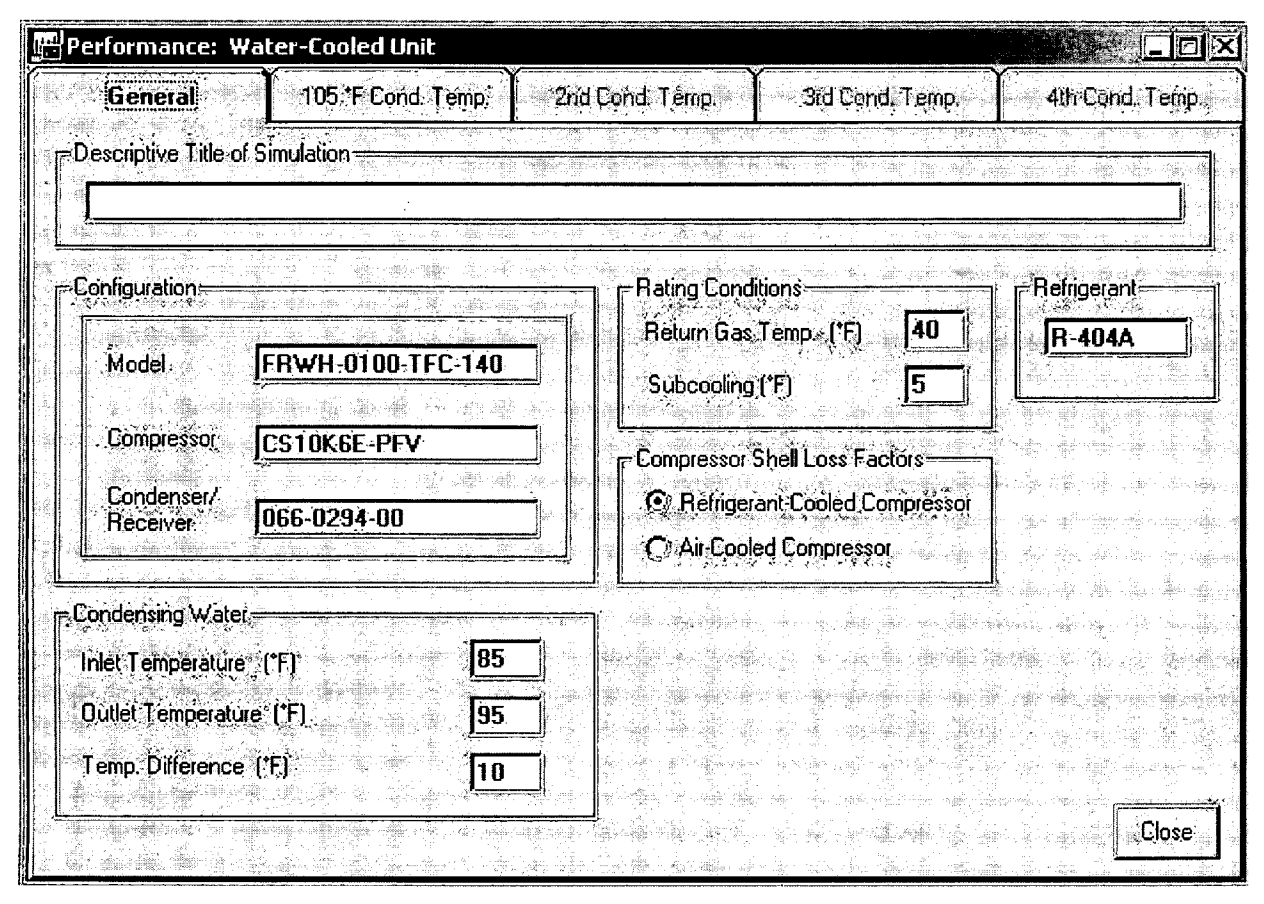

FIG. 16 is a screen-shot illustrating a WCU output summary screen;

Figure 18:
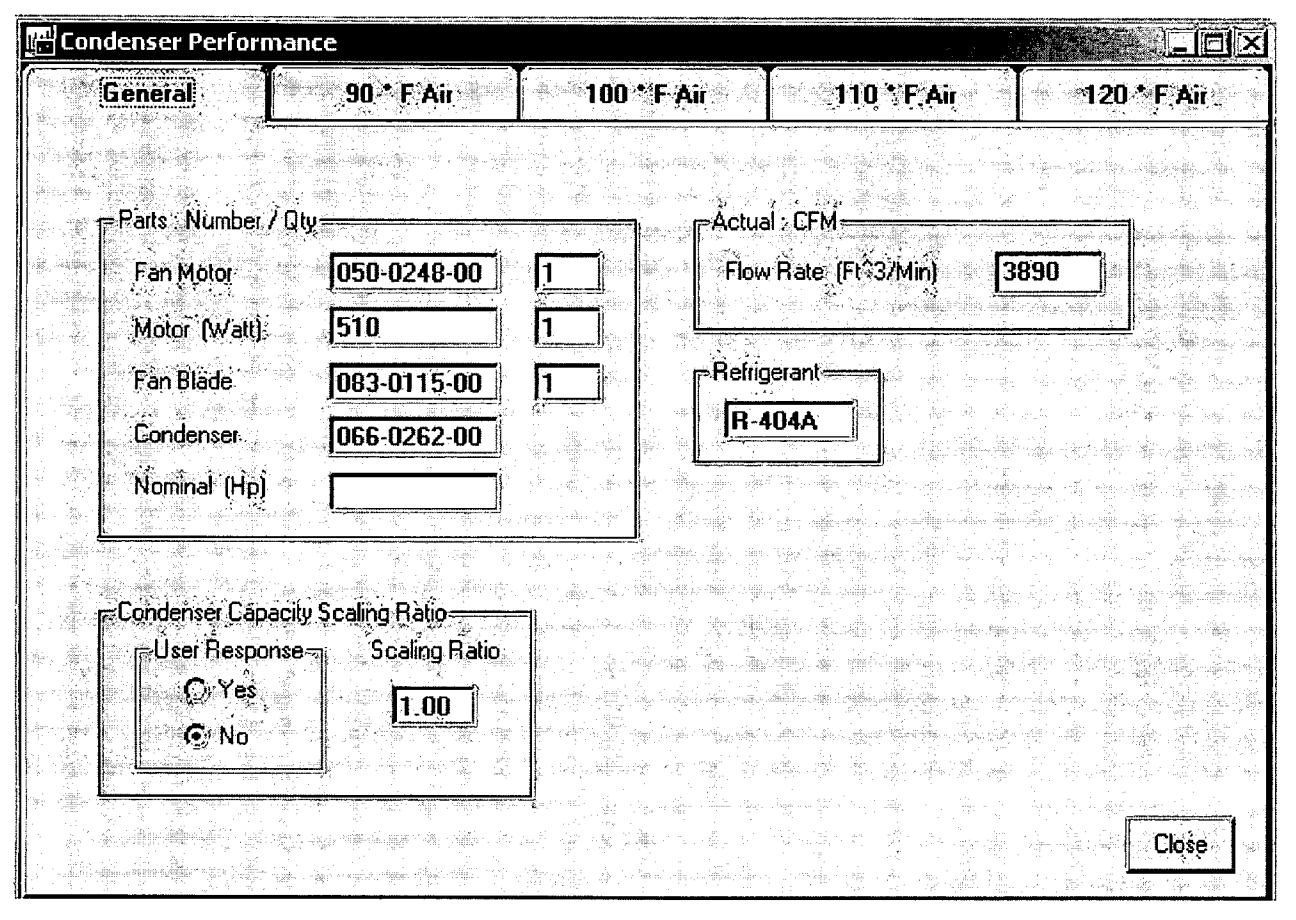

FIG. 18 is a screen-shot illustrating a condenser output summary screen;

FIG. 21 is a screen-shot illustrating rated compressor power;

FIG. 24 is a screen-shot illustrating compressor current.

DETAILED DESCRIPTION OF THE PREFERRED EMBODIMENTS

The following description of the preferred embodiments is merely exemplary in nature and is in no way intended to limit the invention, its application, or uses.

The performance simulator of the present invention enables rapid simulation of steady-state thermal performance of either air- or water-cooled condensing units. The condensing unit is a sub-system of a cooling system such as a refrigeration or air-conditioning system. The condensing unit rejects evaporator heat and compressor energy. Insight into the thermal performance of the condensing unit enables matching of an appropriate condensing unit with a particular cooling system. In other words, the ability to simulate the thermal performance of a particular condensing unit for a given cooling system enables a designer to select an appropriate condensing unit for that cooling system.

Figure 1:
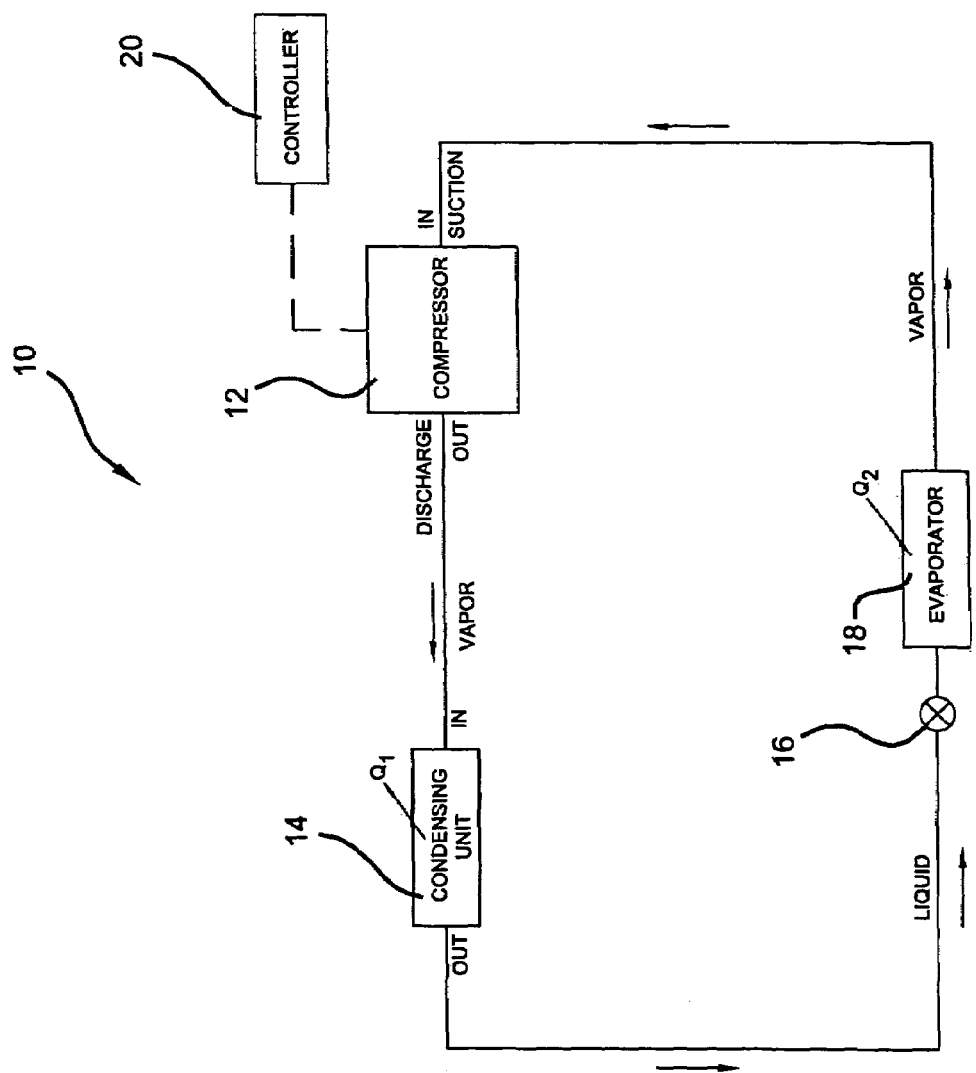
FIG. 1 is a schematic illustration of a generic cooling system incorporating a condensing unit.

Referring now to FIG. 1, a generic cooling system 10 includes a compressor 12, a condensing unit 14, an expansion valve 16 and an evaporator 18. The compressor 12 is controlled by a controller 20 and compresses gaseous refrigerant exiting the evaporator 18. The compressor 12 discharges the high pressure refrigerant to the condensing unit 14. The condensing unit 14 operates as a heat exchanger enabling heat transfer ($Q_1$) from the gaseous refrigerant to a heat sink (e.g. air or water). The refrigerant condenses within the condensing unit 14 and a state change occurs from gas to liquid. The liquid refrigerant exits the condensing unit 14 and flows to the evaporator 18 through the expansion valve 16. The evaporator 18 also operates as a heat exchanger enabling heat transfer ($Q_2$) from the atmosphere surrounding the evaporator 18 to the liquid refrigerant. As the heat transfer occurs, the temperature of the refrigerant increases until a state change occurs from liquid to gas. The gas refrigerant is drawn into the suction side of the compressor 12 and the cooling cycle continues.

The condensing unit 14 can be one of an air-cooled condensing unit (ACU) or a water-cooled condensing unit (WCU). An ACU typically includes a fin-tube refrigerant-to-air heat exchanger, an air flow device such as a fan motor and fan blade and associated controls (not shown). A WCU typically includes a refrigerant-to-water heat exchanger and associated controls (not shown).

The performance simulator includes a series of sub-routines to determine the thermal performance of the condensing unit 14. The sub-routines include a routine to model the thermodynamic property of refrigerants, a curve-fitting routine to fit discrete data values of condenser and compressor performance and a numerical routine to determine convergence of condenser and compressor data. In the case of an ACU, the performance simulator further implements an air-cooled condenser modeling routine and air flow rate look-up tables. In the case of a WCU, the performance simulator further implements a routine to determine the water-side pressure drop. The performance simulator accesses compressor and condenser databases that include compressor coefficients, compressor shell loss factors, ACU and WCU geometries, fan blades, fan motor data, condensing unit physical attributes and tested air flow rates.

The performance simulator is preferably provided as a software package that enables easy entry of pertinent data, as well as automatic access to various databases containing pertinent component information. As a software package, the performance simulator quickly and seamlessly determines the thermal performance of the condensing unit 14 and provides comprehensive performance information in the form of graphs and tables. The performance simulator summarizes the thermal simulation results in a final report.

Figure 2:
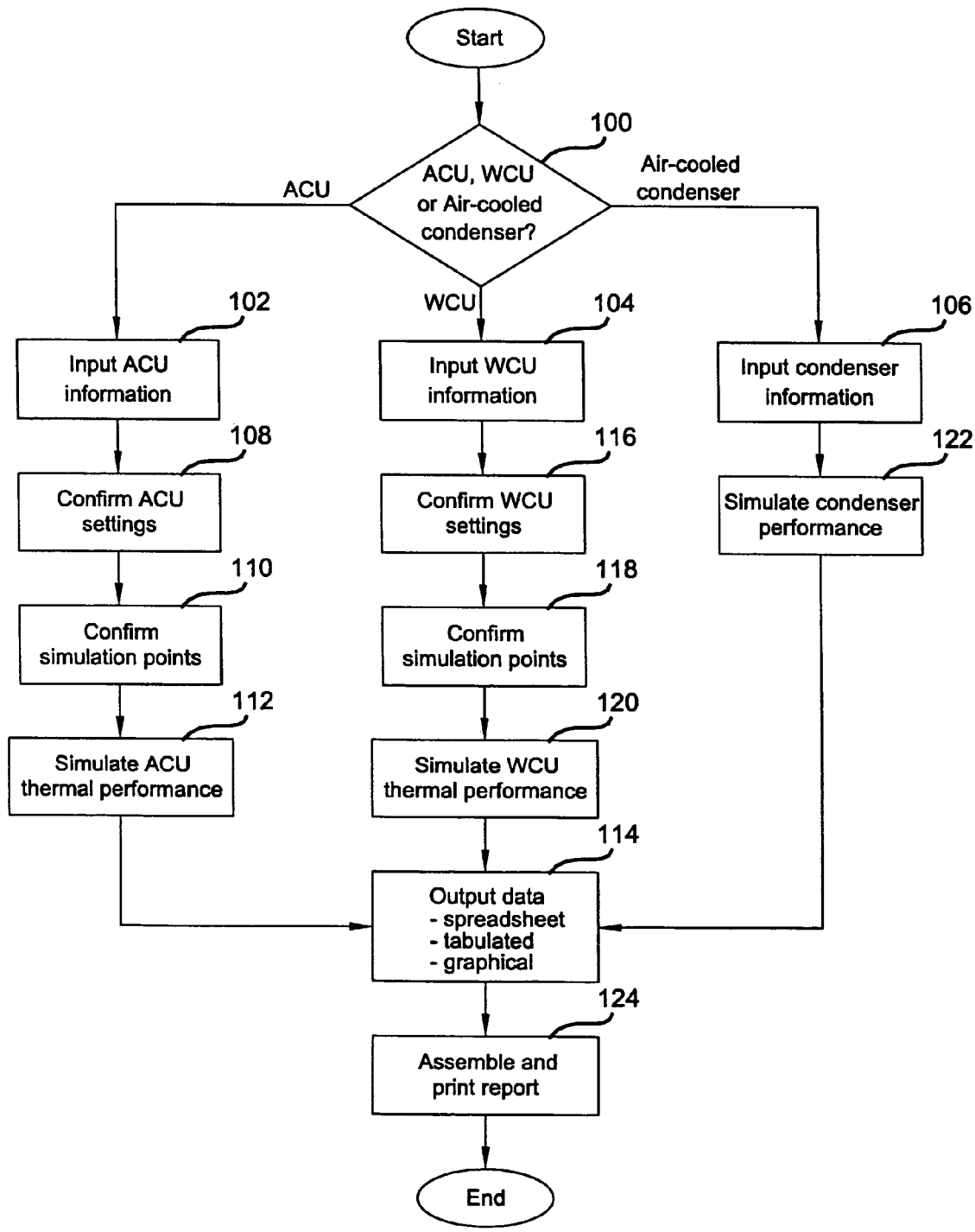
FIG. 2 is a flowchart detailing the condensing unit performance simulator according to the present invention.

Referring now to FIG. 2, a flowchart provides a general outline of the performance simulator. FIGS. 3 through 19 provide software screen-shots illustrating particular steps of the performance simulator. Initially in step 100, the performance simulator determines whether ACU, WCU or condenser simulation is desired based on a user input. If ACU simulation is desired, the performance simulator continues in step 102. If WCU simulation is desired, the performance simulator continues in step 104. If air-cooled condenser simulation alone is desired, the performance simulator continues in step 106.

Figure 3:
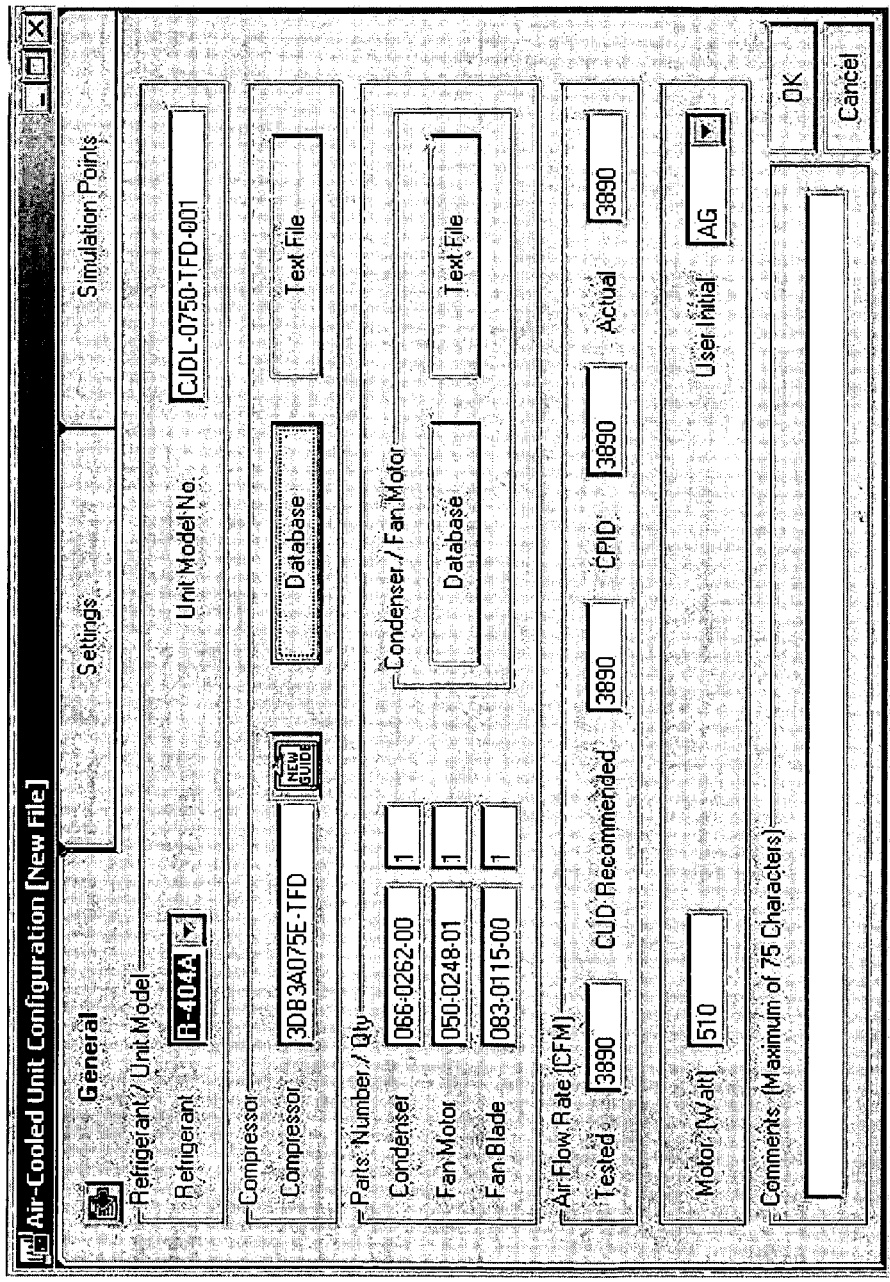
FIG. 3 is a screen-shot illustrating software-based input of air-cooled condensing unit (ACU) information.
Figure 4:
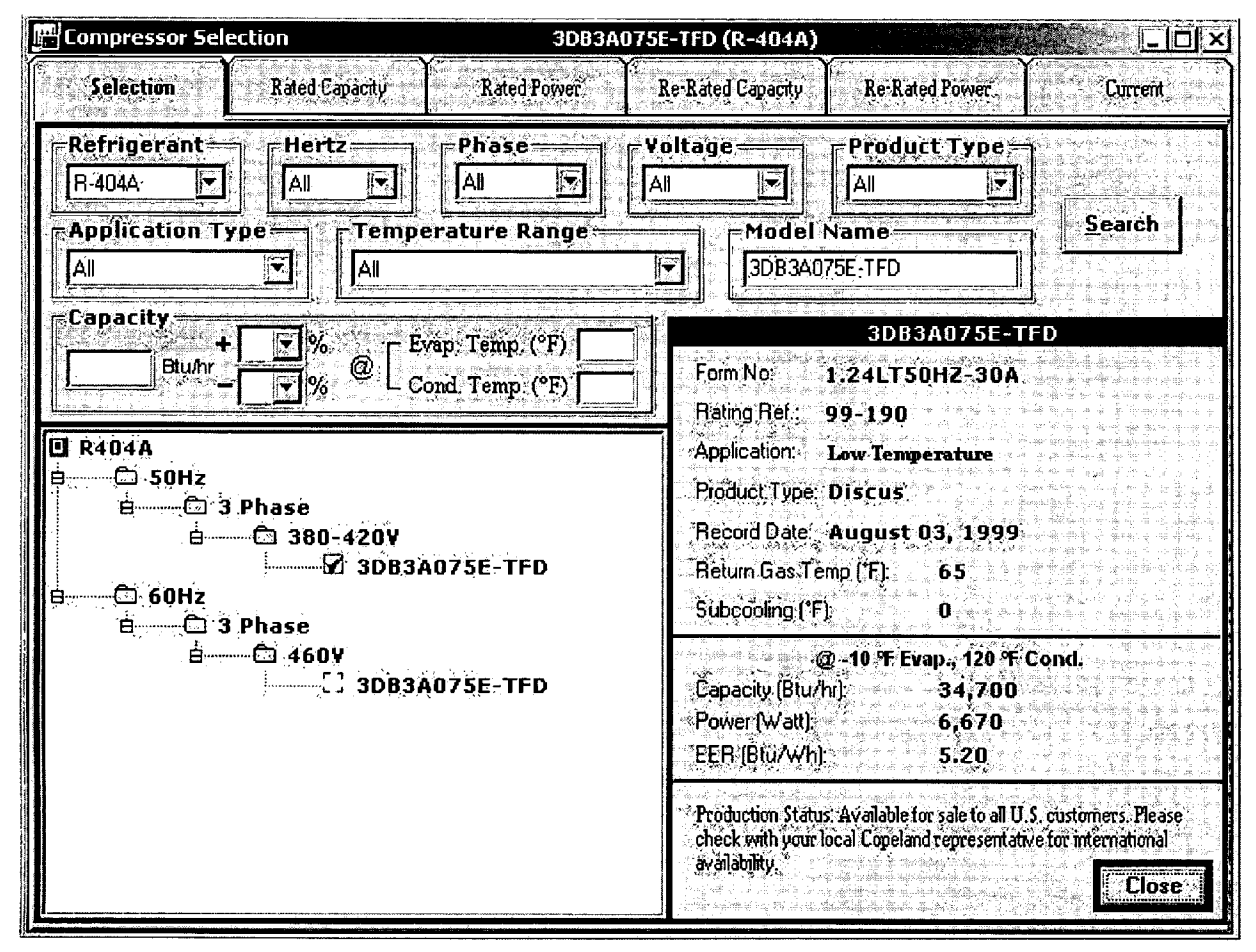
Figure 5:
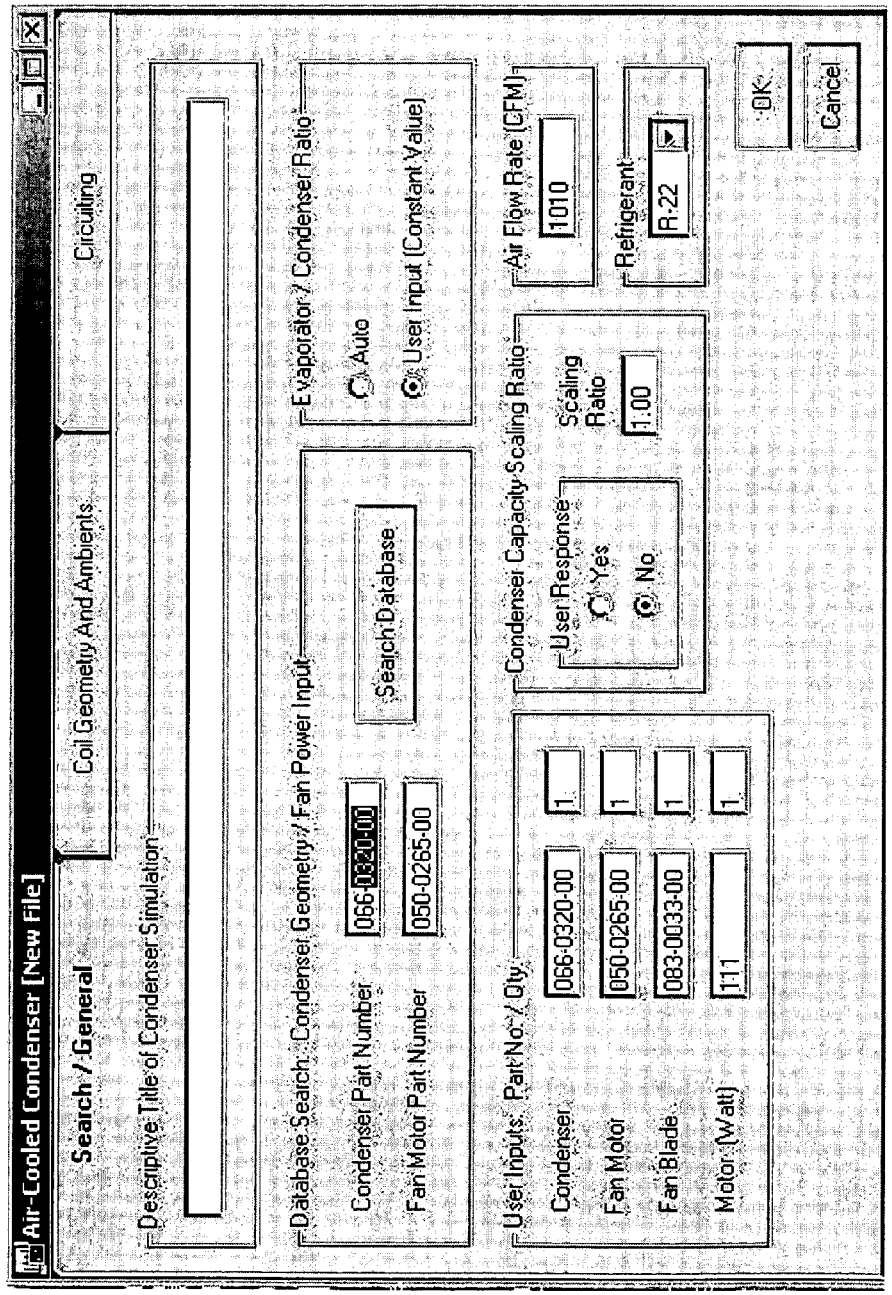
FIG. 5 is a screen-shot illustrating a condenser selection screen.
Figure 6:
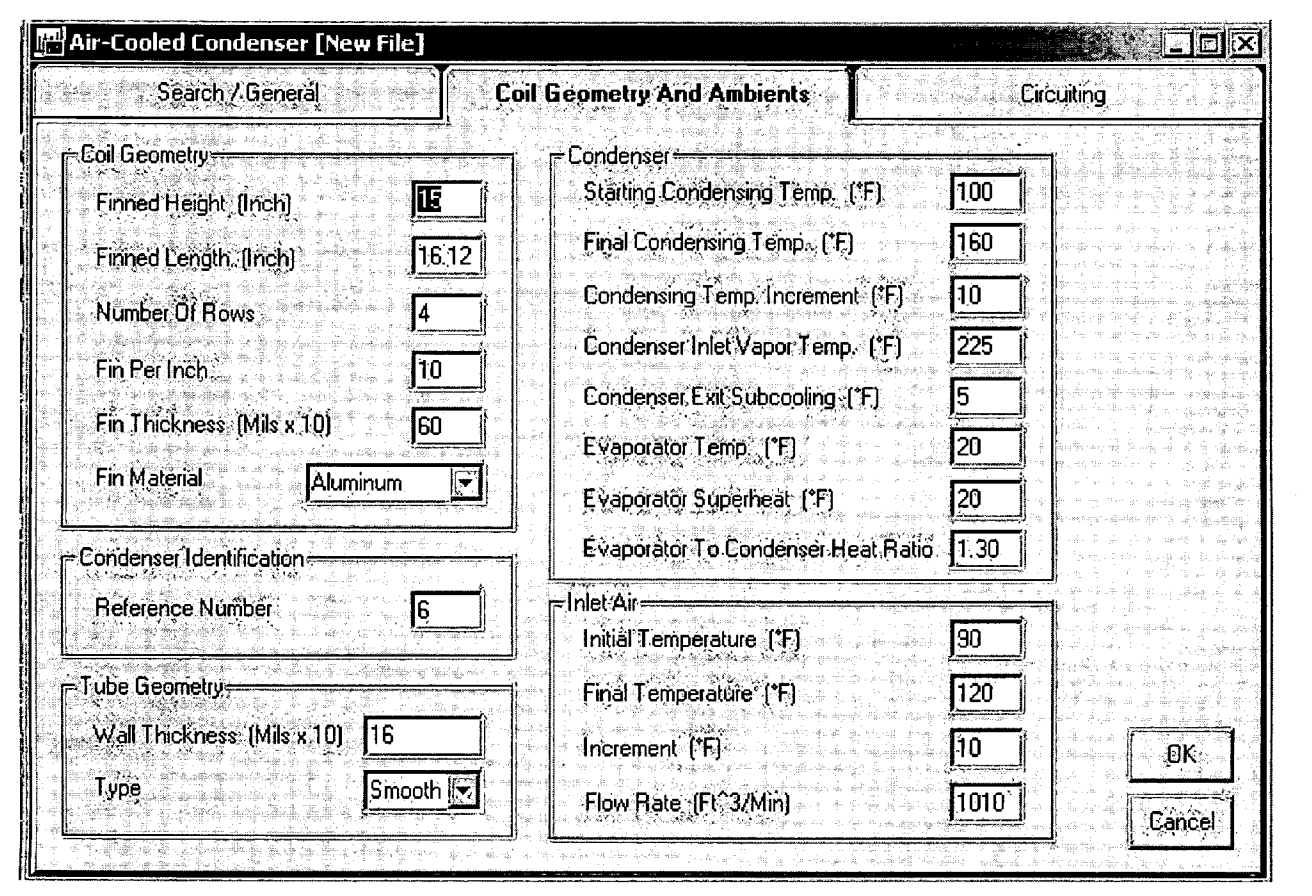

In step 102, a designer inputs pertinent information for the ACU. As shown in FIG. 3, this information includes the refrigerant type, the compressor, the condenser, the fan motor and fan blade. The compressor is selected from a compressor database based upon the refrigerant type, capacity requirements, and operating characteristics (volts, phase, frequency). As shown in FIG. 4, the compressor database provides the compressor options. The appropriate compressor is automatically selected by the performance simulator based on the selected ACU components. A brief summary of the pertinent compressor characteristics is provided. The condenser, fan motor and fan blade details can be selected by particular part numbers from the database. As shown in FIG. 5, the designer inputs the particular part numbers for the components. The performance simulator automatically inputs geometry and temperature characteristics (see FIG. 6) based on the particular condenser, fan motor and fan blade part numbers. The geometry and temperature information is stored in a database accessible by the performance simulator. There is also an option to include multiple condensers, fan motors and fan blades by adjusting the quantity of each. The performance simulator also provides scaling of the compressor and condenser performance. This option enables a designer to match the simulator results with laboratory measured data.

Figure 7:
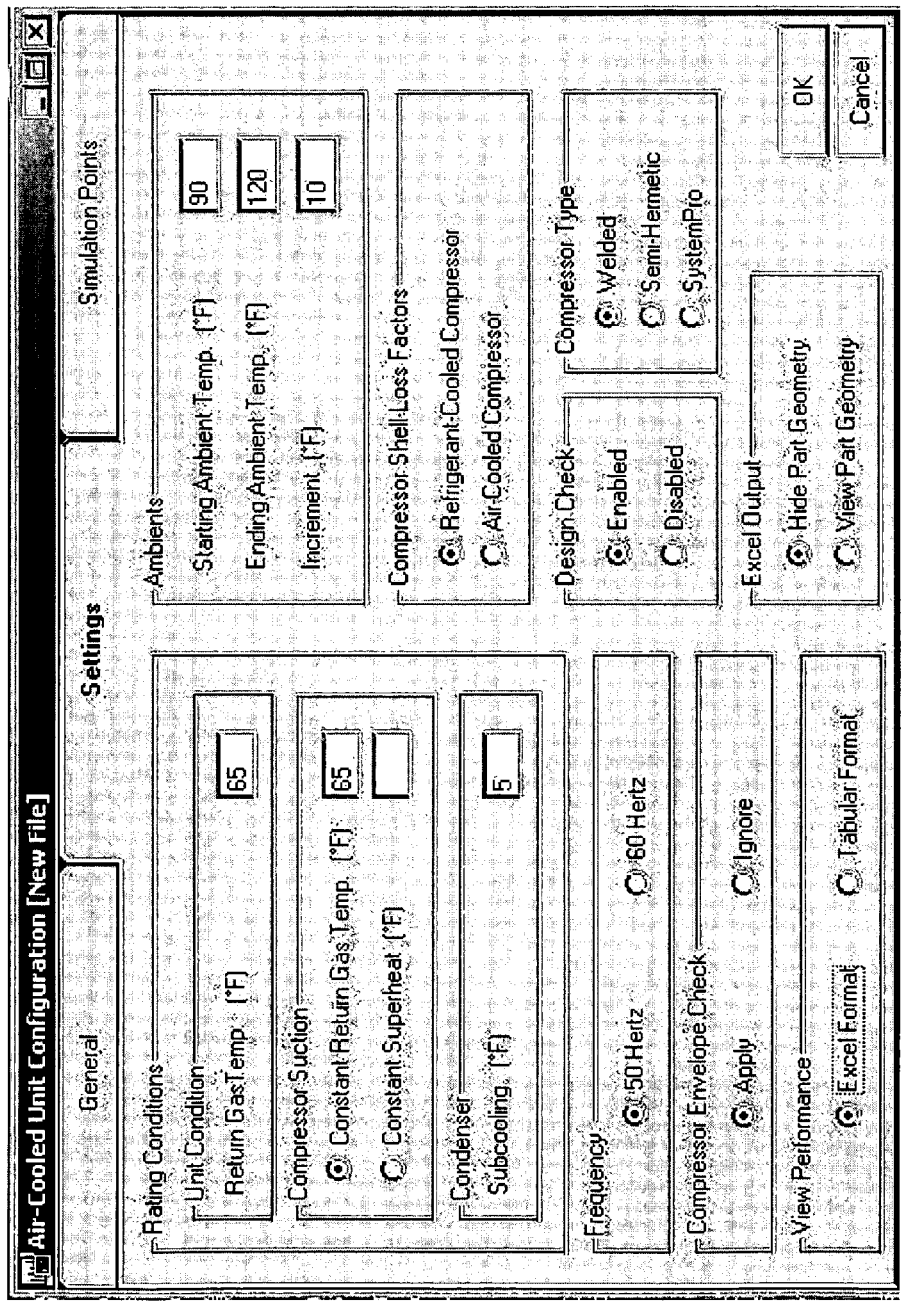
FIG. 7 is a screen-shot illustrating an ACU settings screen.
Figure 8:
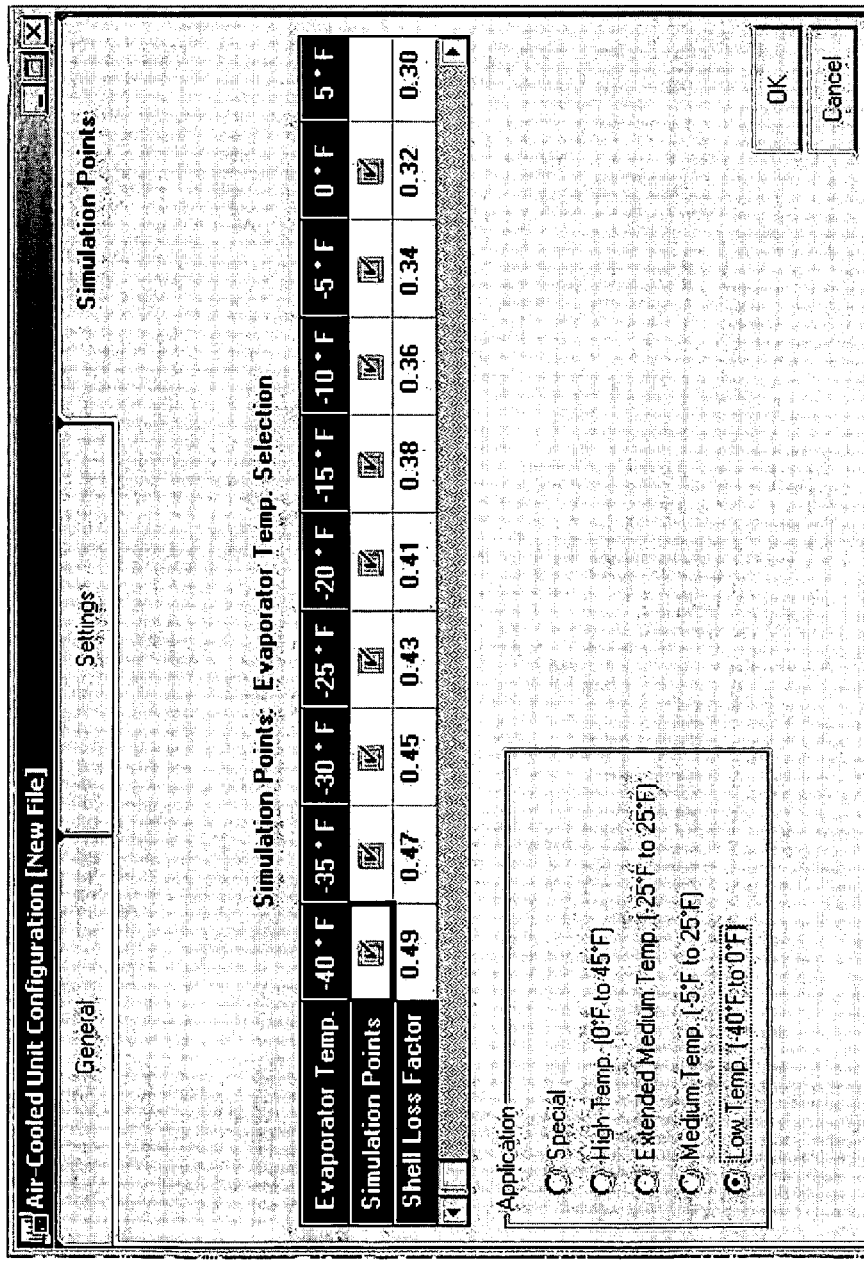
FIG. 8 is a screen-shot illustrating a simulation point selection screen.
Figure 10:
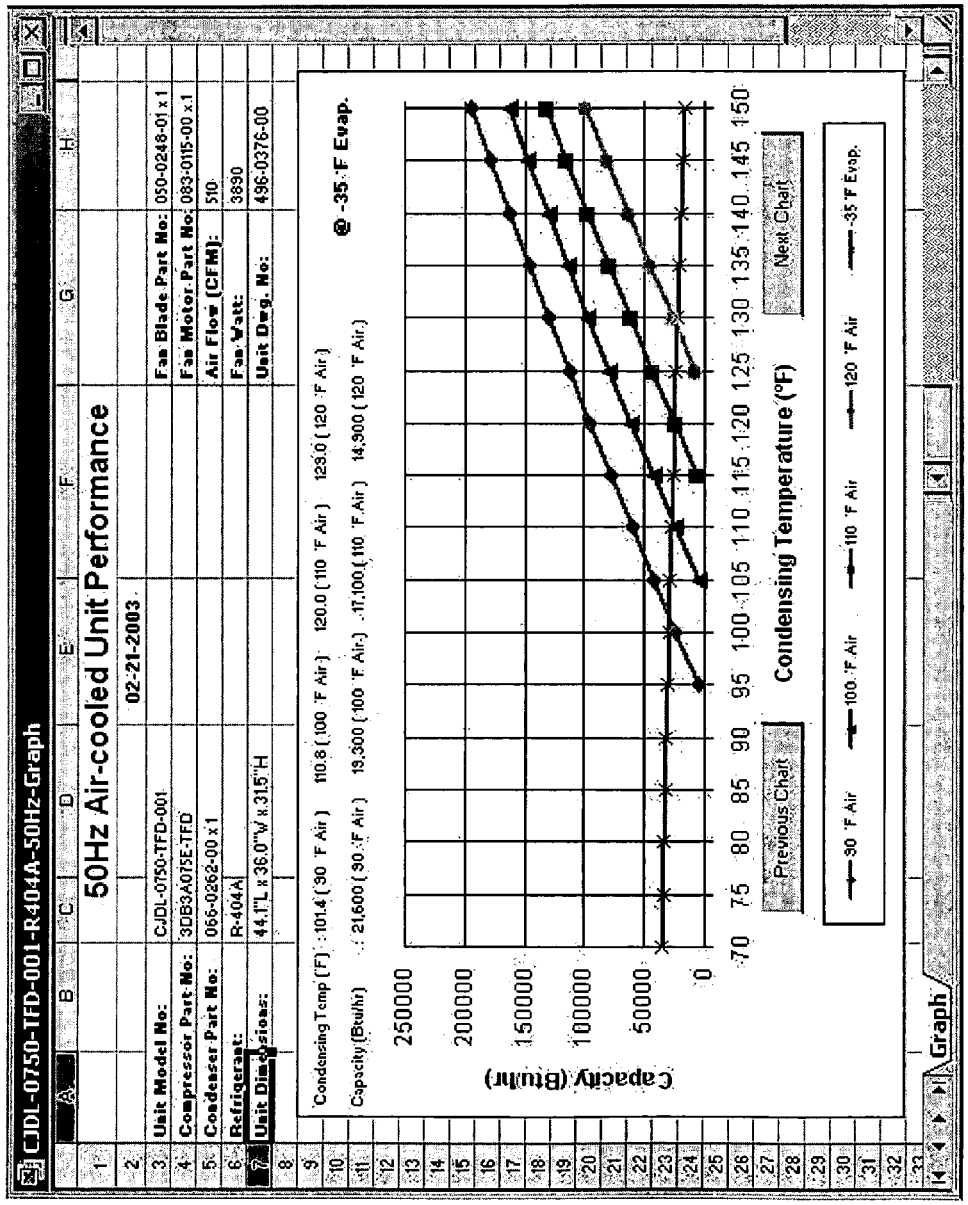
FIG. 10 is a screen-shot illustrating ACU thermal performance output in graphical format.

In step 108, the ACU settings are provided (see FIG. 7). The settings include rating conditions, ambient temperatures, compressor shell loss factors, compressor frequency, compressor envelope check, check of engineering design standards and compressor type. Generally, the settings are default settings based on the ACU components. Other settings may be specified by the designer, such as ambient air temperatures. In step 110, the simulation points are provided. The simulation points indicate the evaporator temperatures at which the ACU performance will be simulated (see FIG. 8). An application type is input by the user and the simulation points are automatically set based thereon. The condensing unit application types include high temperature, extended medium temperature, medium temperature and low temperature evaporators. These application types include predetermined simulation points, which can be altered by the user. A "special" application type is also provided and enables the designer to manually change the simulation points.

After inputting the compressor and condenser information and simulation points, the performance simulator processes the information in step 112 to provide ACU thermal performance data. More particularly, the performance simulator models the ACU and the refrigerant using the condenser modeling sub-routine and refrigerant modeling sub-routine, respectively. The performance simulator further implements the curve-fitting routine, the numerical convergence routine and air flow rate look-up tables to determine the thermal performance of the ACU at the given simulation points.

In step 114, the thermal performance data is provided in either a spreadsheet format (see FIG. 9), graphical format (see FIG. 10) or a tabulated format (see FIG. 11). Regardless of the format chosen, the thermal performance data is provided based on user-specified ambient temperature (e.g. 90, 100, 110, 120° F.). For a given ambient temperature the unit capacity, unit power, unit energy efficiency ratio (EER) and condenser temperature are provide for each simulation point (see FIGS. 9 and 11). The difference between the condenser temperature and ambient is also provided, in addition to refrigeration side pressure drop and air side pressure drop. For 90° F. ambient, data points can be flagged to indicate those that exceed preferred engineering design standards but that are still within the compressor's operating envelope. Any data that falls outside of the compressor's operating envelope is shown with a strike through (see FIG. 12) and will not be included in the final report.

The performance simulator also enables scaling of the data based on compressor operating frequency. More particularly, an operator can scale ACU's 50 Hz performance data to 60 Hz and vice-versa. Using the software-based performance simulator, scaling is achieved in the spreadsheet format by clicking on a scaling icon. The requisite data entries are automatically entered by the performance simulator and can be manually altered by the operator. The performance simulator then updates the thermal performance data based on the scaling information.

Figure 13:
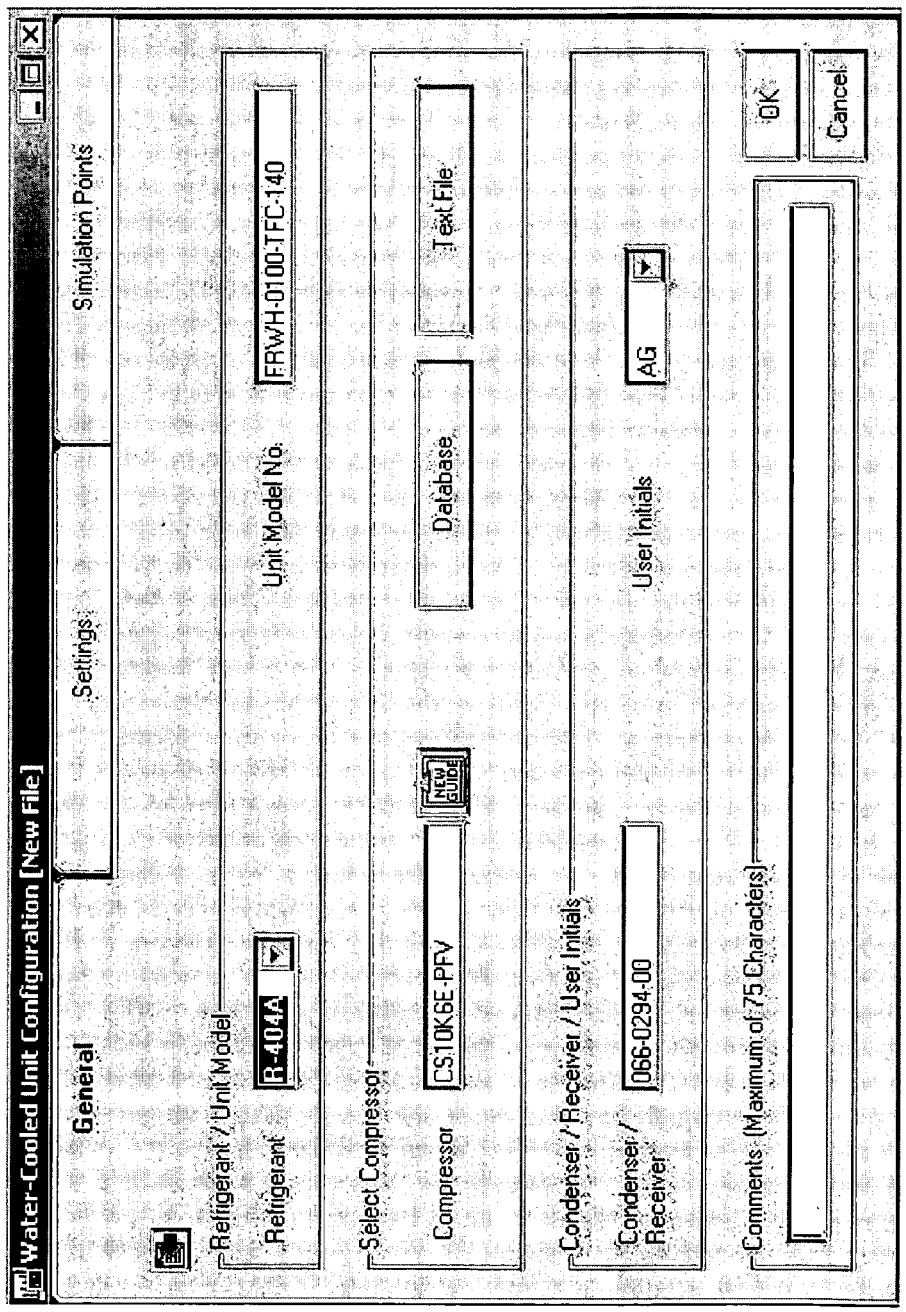
FIG. 13 is a screen-shot illustrating an input screen for water-cooled condensing unit (WCU) information.

In step 104, pertinent information for the WCU is input. As shown in FIG. 13, this information includes the refrigerant type, the compressor, the condenser/receiver, inlet and outlet water temperatures. The designer selects a desired WCU model number from a pop-up menu. The performance simulator automatically fills-in the remaining information based on the selected WCU model number. The compressor is selected from a compressor database based upon the refrigerant type. The compressor database provides the compressor options for the compressor types automatically selected by the performance simulator based on the WCU model number. A brief summary of the pertinent compressor characteristics is provided.

Figure 14:
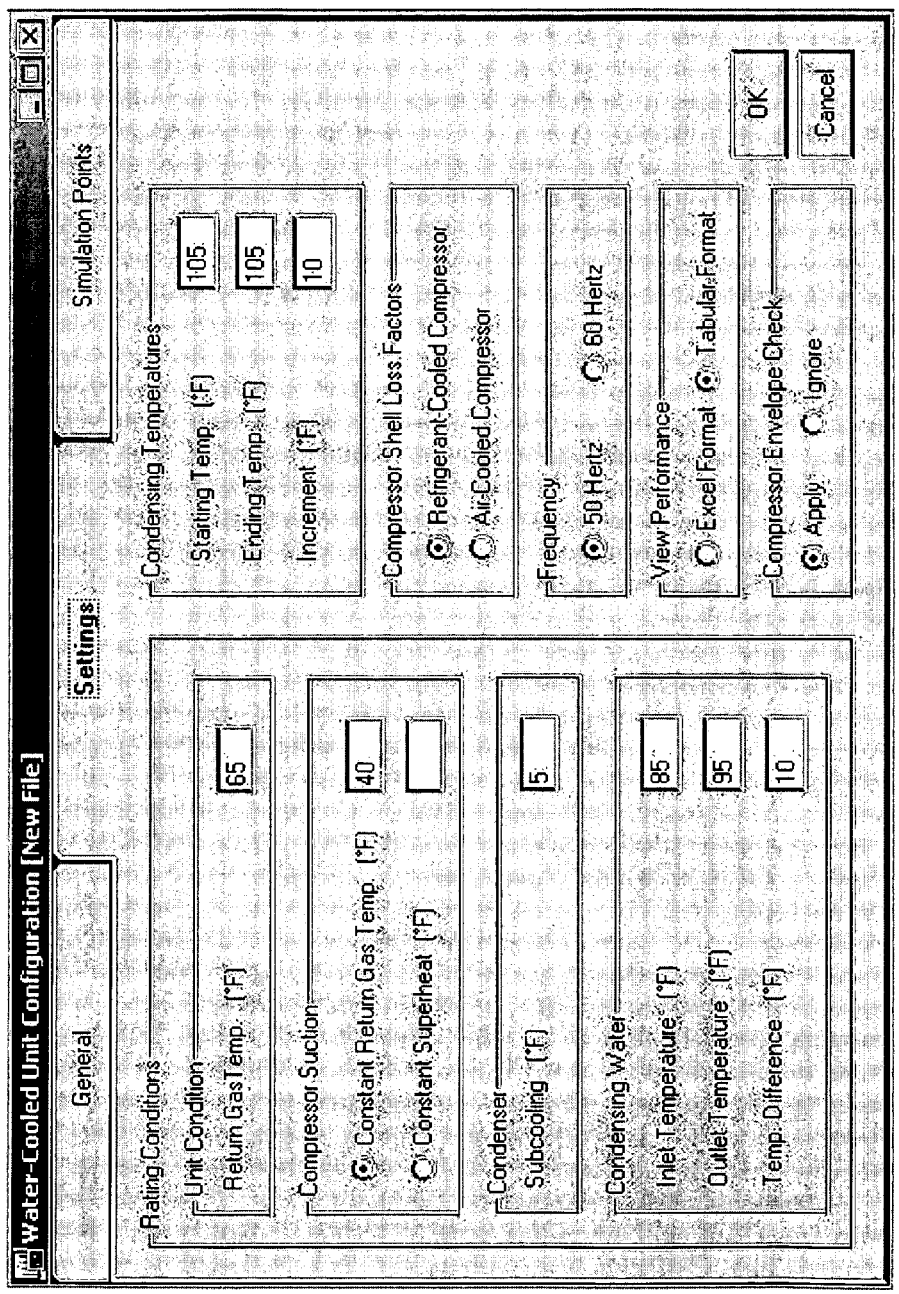
FIG. 14 is a screen-shot illustrating a WCU settings screen.
Figure 15:
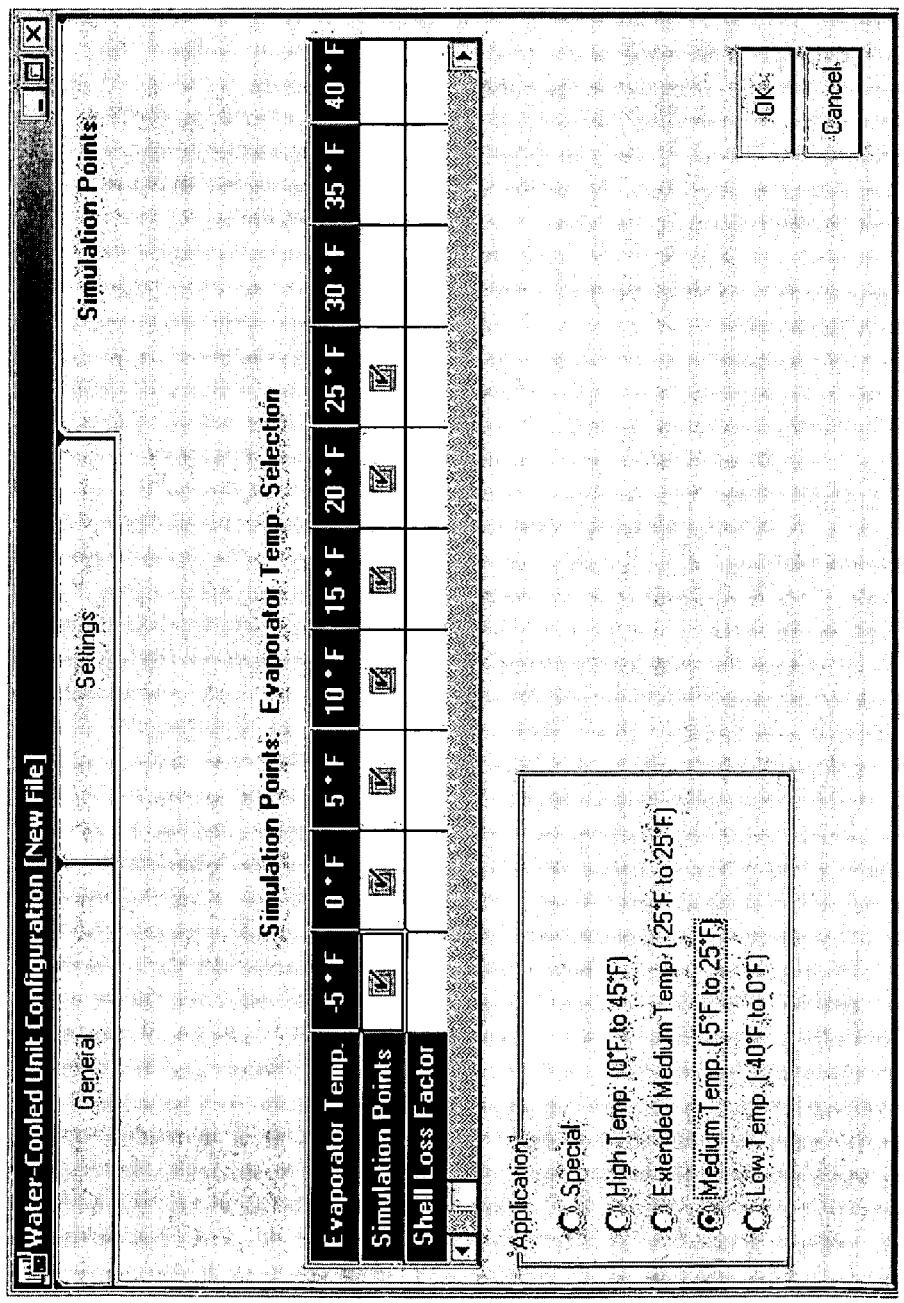
FIG. 15 is a screen-shot illustrating a simulation point selection screen.
Figure 17:
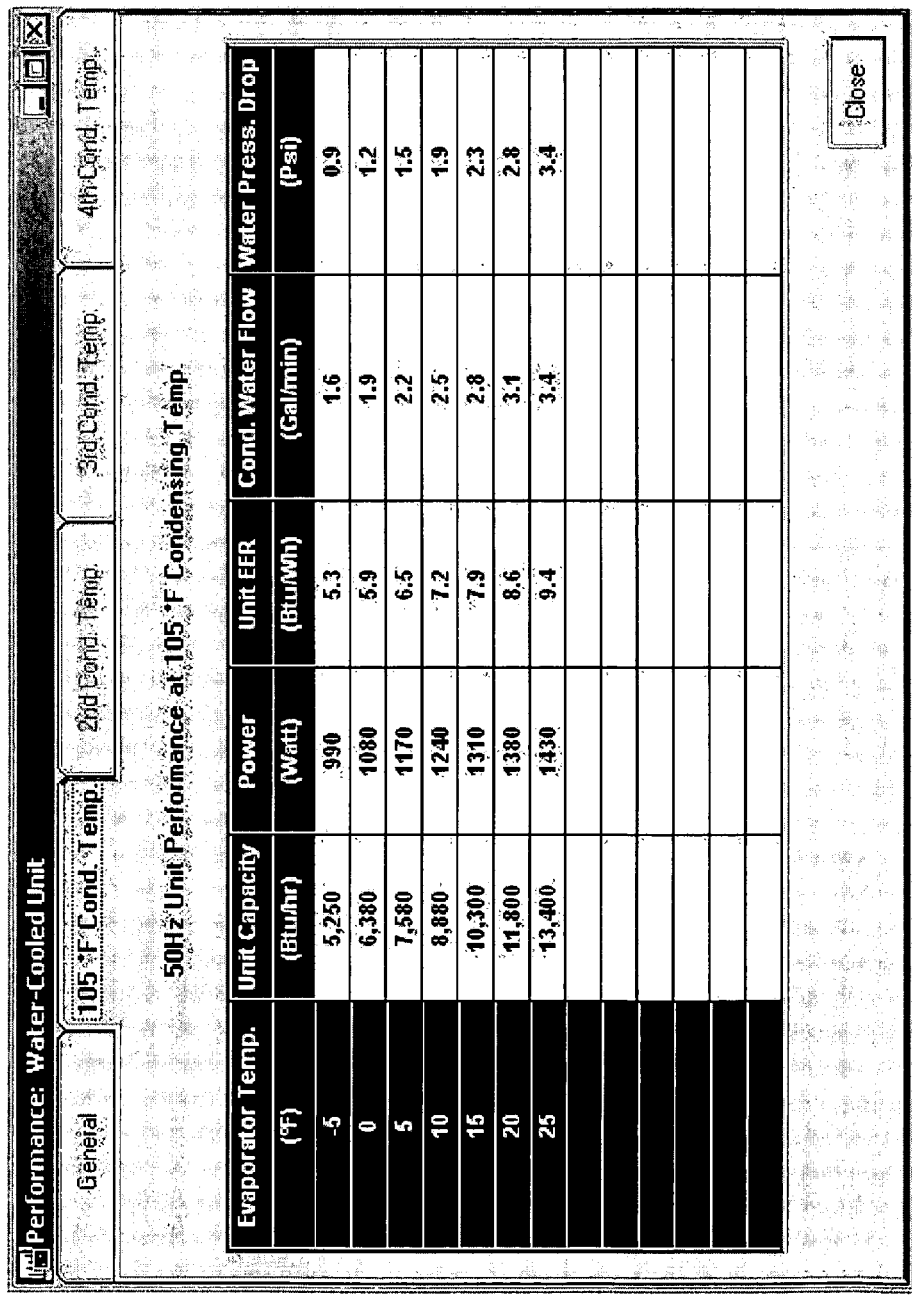
FIG. 17 is a screen-shot illustrating WCU thermal performance output in tabulated format.
Figure 19:
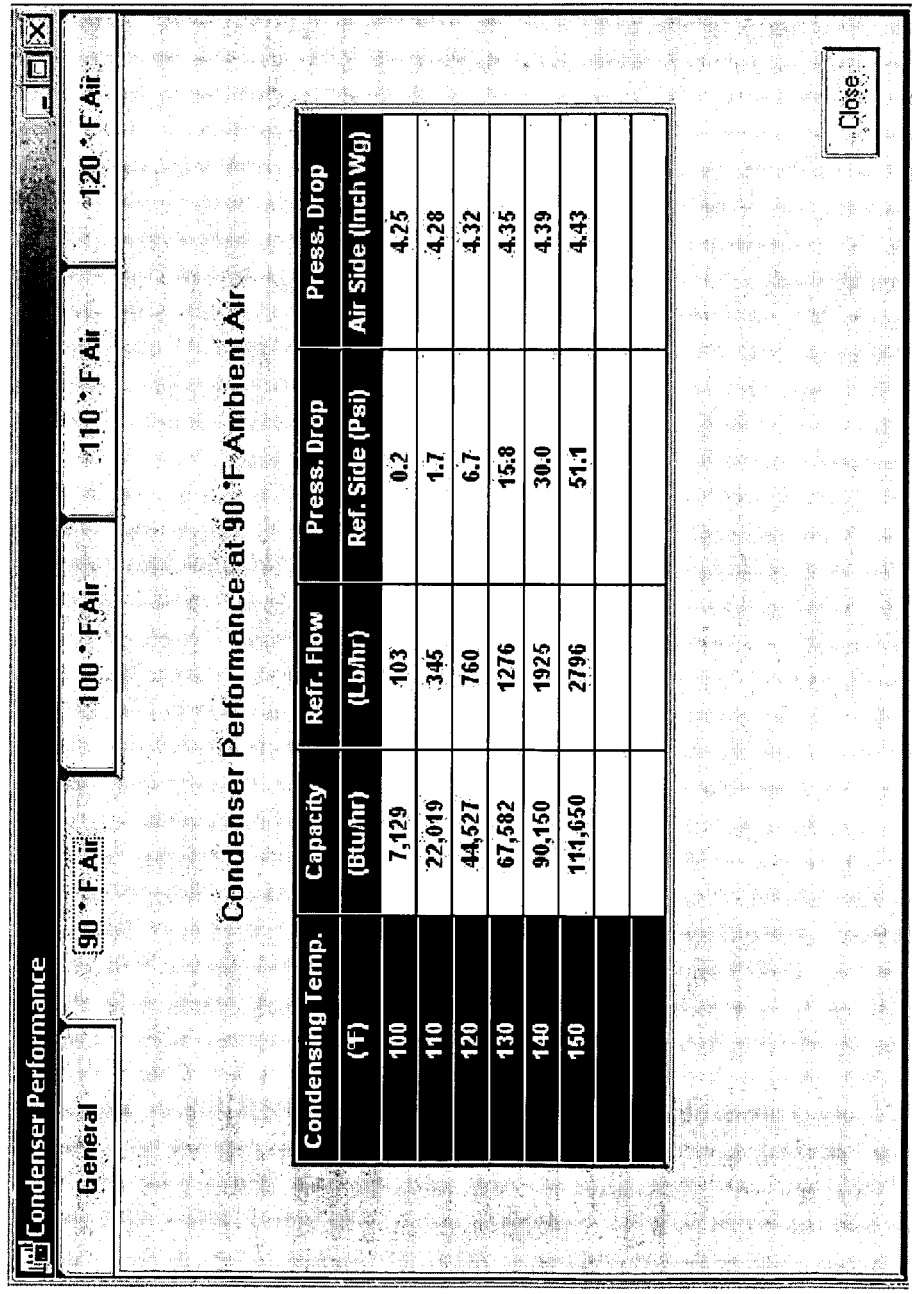
FIG. 19 is a screen-shot illustrating condenser thermal performance output in tabulated format.
Figure 20:
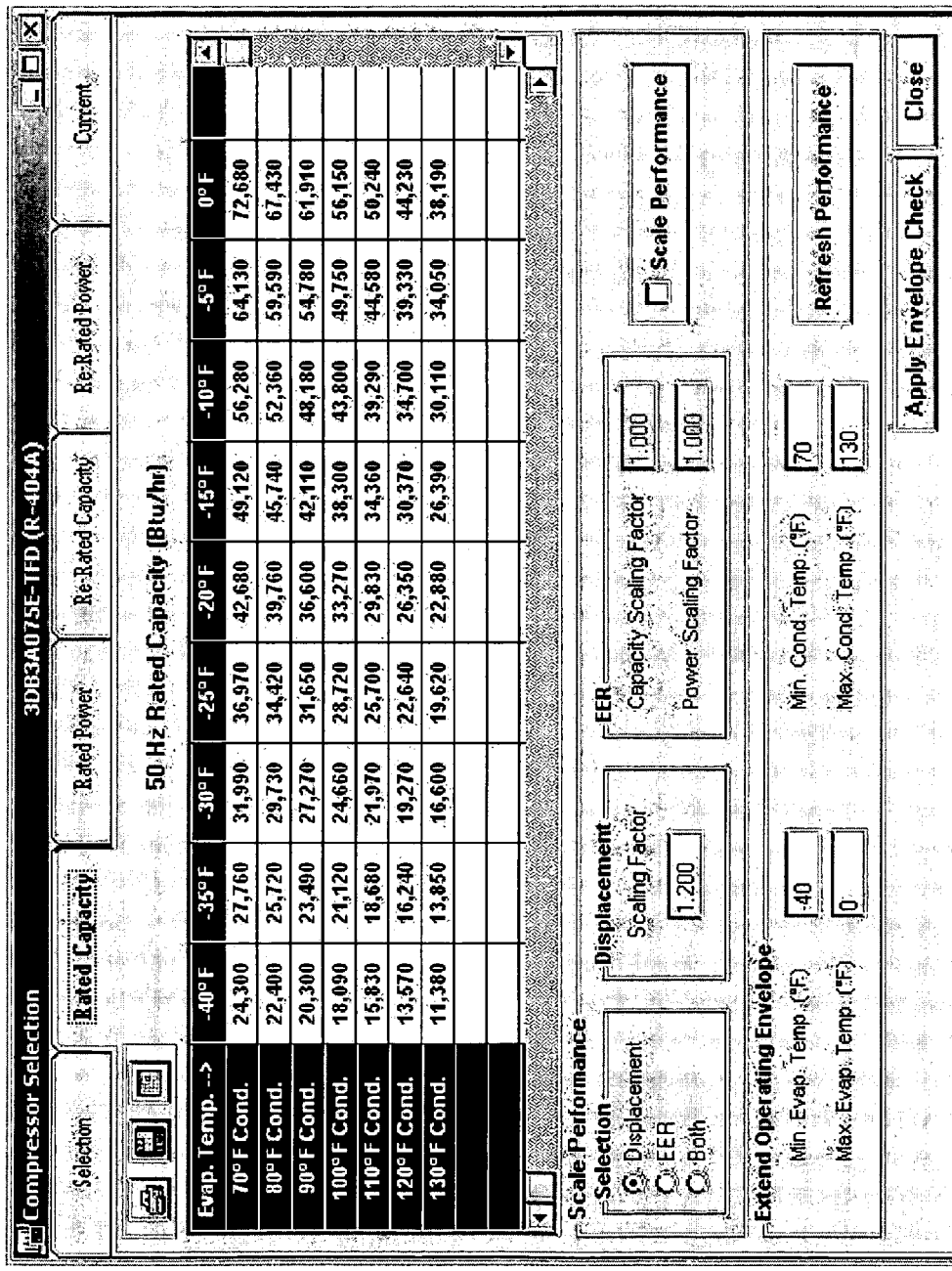
FIG. 20 is a screen-shot illustrating rated compressor capacity.
Figure 22:
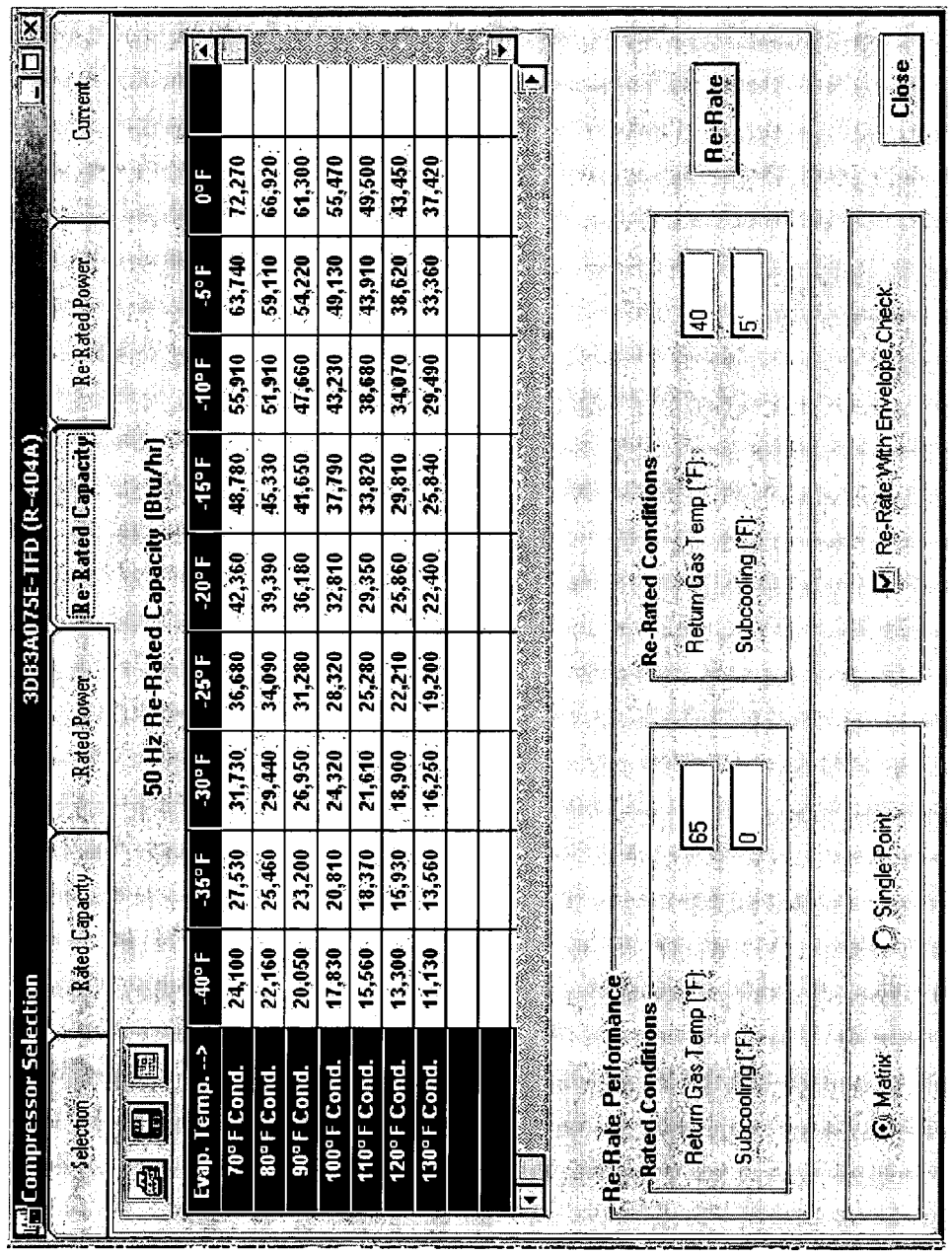
FIG. 22 is a screen-shot illustrating re-rated compressor capacity.
Figure 23:
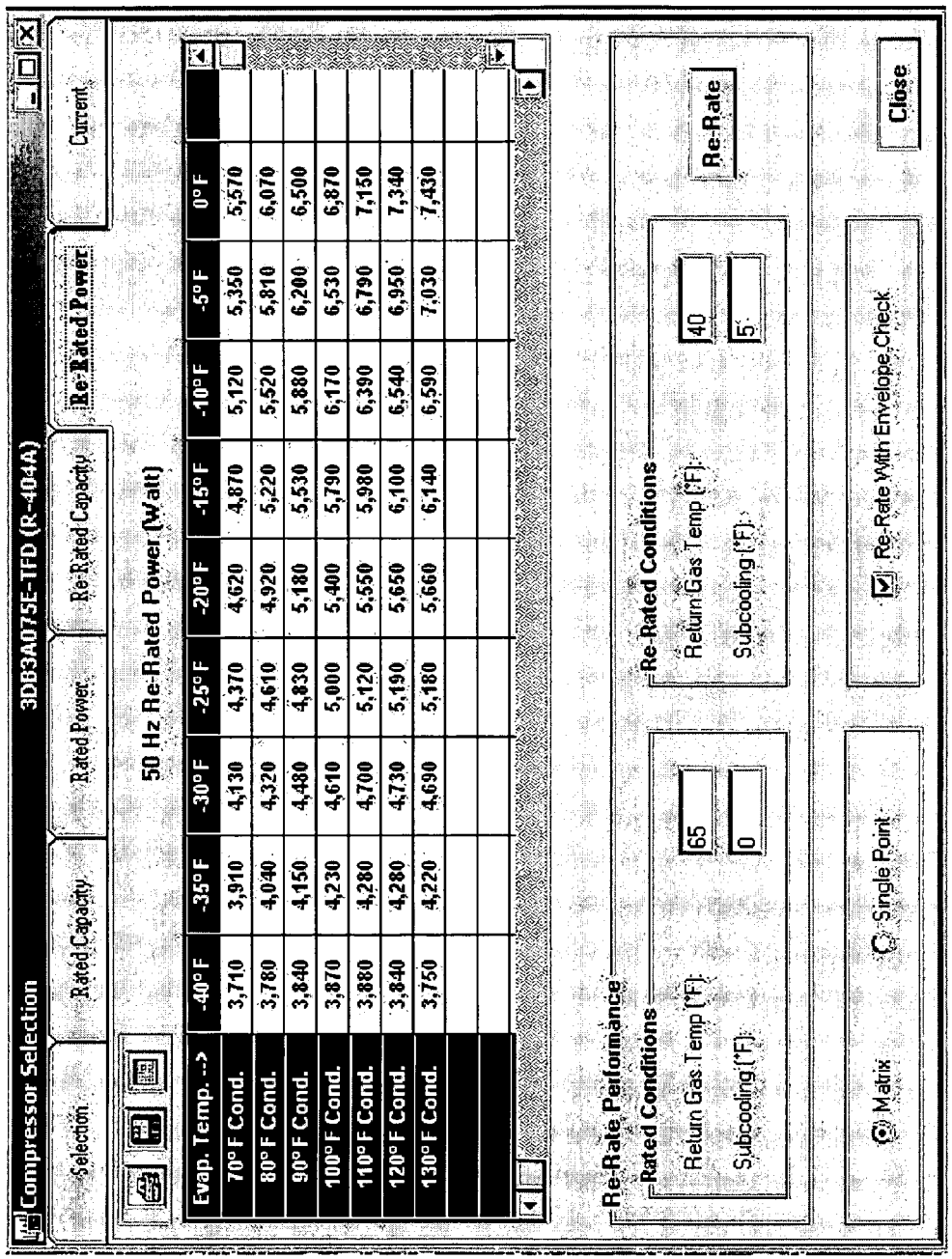
FIG. 23 is a screen-shot illustrating re-rated compressor power.

In step 116, the WCU settings are provided (see FIG. 14). The settings include rating conditions, condensing temperatures, compressor shell loss factors, compressor frequency, compressor envelope check and design check. The rating conditions include return gas temperature, compressor suction temperatures, condenser sub-cooling temperature and condensing water temperatures. Generally, the settings are default settings based on the WCU components. In step 118, the simulation points are provided. The simulation points indicate the evaporator temperatures at which the WCU performance will be simulated (see FIG. 15). An application type is input by the user and the simulation points are automatically set based thereon. The application types include high temperature, extended medium temperature, medium temperature and low temperature evaporators. A "special" application type is also provided and enables the designer to manually change the simulation points.

After inputting the compressor and condenser information and simulation points, the performance simulator processes the information in step 120 to provide WCU thermal performance data. More particularly, the performance simulator models the compressor performance using the refrigerant modeling sub-routine and determines the water-side pressure drop using the corresponding sub-routine. The performance simulator further implements the curve-fitting routine, the numerical convergence routine to determine the thermal performance of the WCU at the given simulation points. As similarly described above, the thermal performance data is provided in step 114 in either a spreadsheet format, graphical format or a tabulated format (see FIGS. 16 and 17).

In step 106, the air-cooled condenser, fan motor and fan blade can be selected by particular part numbers or selected from a menu. As similarly shown in FIG. 5, the designer inputs the particular part numbers for the components. The performance simulator automatically inputs geometry and temperature characteristics based on the particular condenser, fan motor and fan blade selected. The geometry and temperature information is stored in the condenser database accessible by the performance simulator. There is also an option to include multiple condensers, fan motors and fan blades by adjusting the quantity of each. The performance simulator also provides scaling of the condenser performance. This option enables a designer to match the simulator results with laboratory measured data.

After inputting the condenser information, the performance simulator processes the information in step 122 to provide condenser thermal performance data. The performance simulator processes the information as described above with regard to the ACU. As similarly described above, the thermal performance data can be provided in step 114 in either a spreadsheet format, graphical format or a tabulated format. The thermal performance data is provided based on user-specified ambient temperature (e.g. 90, 100, 110, 120° F.). For a given ambient temperature the condenser capacity, refrigeration flow, the refrigeration side pressure drop and air-side pressure drop are provide for a range of condensing temperatures (see FIGS. 18 and 19).

In step 124, the performance simulator assembles and prints a final report summarizing the performance results. Also included is a sign-off sheet that summarizes pertinent information such as the identification of the simulation requestor, the date of simulation request, the file names under which the performance results are stored, the application type and the like.

Referring now to FIGS. 20 through 24, the performance simulator provides detailed compressor information including compressor capacity (see FIG. 20), compressor power (see FIG. 21) and current (see FIG. 24) based on evaporator and condenser temperatures. The compressor capacity and power can be scaled based on displacement, the EER or both. Additionally, the compressors operating envelope can be extended. The scaling and envelope extension options enable "what if" design analysis. The compressor capacity and performance can also be re-rated to reflect performance at actual conditions (see FIGS. 22 and 23). Actual conditions are often different than those at which the compressor is rated. Re-rating is achieved based on the thermodynamic properties of the particular refrigerant.

The software-based performance simulator further includes a directory management routine for managing and organizing performance data files. The directory management routine enables an operator to specify directories in which files are to be stored and reorganize the files and directories as desired.

The performance simulator of the present invention enables quick steady-state thermal performance simulation of ACU's, WCU's and stand-alone condensers. The thermal performance data is used to evaluate system requirements such that an appropriate ACU, WCU or condenser can be selected to either replace a unit within a current cooling system or in the design of a new cooling system.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system comprising:
    a condensing unit database including condensing unit characteristics of a selected condensing unit;
    an interface operable to select multiple simulation points for said selected condensing unit, said multiple simulation points being based on evaporator temperatures determined from an application type for an evaporator; and
    a processor in communication with said condensing unit database, operable to process said condensing unit characteristics and said multiple simulation points, and operable to output thermal performance data of said selected condensing unit based on said condensing unit characteristics and said multiple simulation points.

2. The system of claim 1 further comprising a compressor database including compressor characteristics of a selected compressor and in communication with said processor, wherein said processor is further operable to process said compressor characteristics and said multiple simulation points, and operable to output thermal performance data of said selected condensing unit based on said compressor characteristics and said multiple simulation points.

3. The system of claim 2 wherein said compressor characteristics include at least one of capacity, electrical characteristics, and refrigerant type.

4. The system of claim 2 wherein said thermal performance data includes flagged thermal performance data that falls outside of a design envelope of said selected compressor.

5. The system of claim 2 wherein said processor is operable to scale said thermal performance data based on an operating frequency of said selected compressor.

6. The system of claim 1 wherein said condensing unit characteristics include at least one of condenser type, fan motor type, fan blade type, air flow rate, component geometries, air temperature, and condenser temperature characteristics.

7. The system of claim 1 wherein said application type includes one of a low temperature range, a medium temperature range, an extended medium temperature range, and a high temperature range.

8. The system of claim 1 wherein said thermal performance data includes at least one of a graph, a spreadsheet, and a table.

9. A system comprising:
    a condensing unit database including condensing unit characteristics of a selected condensing unit;
    an interface operable to select simulation points for said selected condensing unit; and
    a processor in communication with said condensing unit database, operable to process said condensing unit characteristics and said simulation points, operable to output thermal performance data of said selected condensing unit based on said condensing unit characteristics and said simulation points and operable to tone said simulation points with actual test data to scale said thermal performance data.

10. The system of claim 1 wherein said condensing unit database includes part numbers of condensing unit components.

11. A system comprising:
    a condensing unit database including condensing unit characteristics of a selected condensing unit;
    an interface operable to select simulation points for said selected condensing unit; and
    a processor in communication with said condensing unit database, operable to process said condensing unit characteristics and said simulation points, and operable to output thermal performance data of said selected condensing unit based on said condensing unit characteristics and said simulation points, wherein said thermal performance data includes condensing unit capacity across at least one of said simulation points for a given temperature.

12. A method comprising:
    selecting a condensing unit from a condensing unit database, said selected condensing unit having condensing unit characteristics;
    selecting a compressor from a compressor database, said selected compressor having compressor characteristics;
    selecting an application type for an evaporator;
    determining multiple simulation points based on said application type;
    processing said condensing unit characteristics and compressor characteristics based on said multiple simulation points; and
    outputting thermal performance data.

13. The method of claim 12 wherein selecting a compressor includes selecting based on at least one of capacity, electrical characteristics, and refrigerant type.

14. The method of claim 12 wherein selecting a condensing unit from a condensing unit database further includes selecting at least one of a condenser, a fan motor, a fan blade, an air flow rate, component geometries, an air temperature, and condenser temperature characteristics.

15. The method of claim 12 further including toning said multiple simulation points during processing with actual test data.

16. The method of claim 12 wherein said multiple simulation points include evaporator temperatures.

17. The method of claim 12 wherein said application type includes one of a low temperature range, a medium temperature range, an extended medium temperature range and a high temperature range.

18. The method of claim 12 wherein said outputting includes outputting said thermal performance data in at least one of a graphical format, a spreadsheet format and a tabulated format.

19. The method of claim 12 wherein said thermal performance data includes condensing unit capacity across each of said simulation points for a given ambient temperature.

20. The method of claim 12 further comprising striking thermal performance data that falls outside of an operating envelope of said compressor.

21. The method of claim 12 further comprising scaling said thermal performance data based on a compressor frequency.

22. The method of claim 12 wherein said outputting includes displaying said thermal performance data.

23. The method of claim 12 wherein said outputting includes reporting said thermal performance data.

24. A method comprising:
selecting a condensing unit from a condensing unit database, said selected condensing unit having condensing unit characteristics;
selecting a compressor from a compressor database, said selected compressor having compressor characteristics;
processing said condensing unit characteristics and compressor characteristics based on simulation points;
outputting thermal performance data; and flagging thermal performance data that falls outside of a design envelope of said compressor.

* * * * *